(12) United States Patent
Li et al.

(10) Patent No.: US 10,795,752 B2
(45) Date of Patent: Oct. 6, 2020

(54) DATA VALIDATION

(71) Applicant: ACCENTURE GLOBAL SOLUTIONS LIMITED, Dublin (IE)

(72) Inventors: Chung-Sheng Li, San Jose, CA (US); Emmanuel Munguia Tapia, San Jose, CA (US); Mohammad Ghorbani, Foster City, CA (US); Jingyun Fan, Berkeley, CA (US); Priyankar Bhowal, Gurgaon (IN); David Clune, Knoxville, TN (US); Sumraat Singh, Faridabad (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 101 days.

(21) Appl. No.: 16/002,516

(22) Filed: Jun. 7, 2018

(65) Prior Publication Data
US 2019/0377624 A1 Dec. 12, 2019

(51) Int. Cl.
*G06F 11/00* (2006.01)
*G06F 11/07* (2006.01)
*G06F 40/30* (2020.01)
*G06F 40/279* (2020.01)

(52) U.S. Cl.
CPC ........ *G06F 11/079* (2013.01); *G06F 11/0751* (2013.01); *G06F 11/0772* (2013.01); *G06F 11/0787* (2013.01); *G06F 11/0793* (2013.01); *G06F 40/279* (2020.01); *G06F 40/30* (2020.01)

(58) Field of Classification Search
CPC .. G06F 11/008; G06F 11/079; G06F 11/3409; G06F 11/3452; G06F 11/3604

USPC .......................................................... 714/37
See application file for complete search history.

(56) References Cited

U.S. PATENT DOCUMENTS

| 8,290,968 | B2 | 10/2012 | Jonas | |
|---|---|---|---|---|
| 2002/0091972 | A1* | 7/2002 | Harris | G06F 11/008 714/47.2 |
| 2004/0221295 | A1* | 11/2004 | Kawai | H04L 51/08 719/313 |
| 2007/0177184 | A1* | 8/2007 | Boston | B43M 3/045 358/1.14 |
| 2008/0256512 | A1* | 10/2008 | Meijer | G06F 8/71 717/110 |
| 2012/0209620 | A1* | 8/2012 | Ebadollahi | G06Q 10/06393 705/2 |
| 2013/0212455 | A1* | 8/2013 | Titera | G06Q 40/00 715/205 |

(Continued)

*Primary Examiner* — Sarai E Butler
(74) *Attorney, Agent, or Firm* — Mannava & Kang, P.C.

(57) ABSTRACT

In an example, data, such as, a journal entry in a ledger, to be validated and associated supporting documents may be extracted. Further, an entity, indicative of a feature of the data may be extracted. Based on the extracted entity, one or more probable values for a field of the data may be determined. A probability score may be associated each of the probable values of the field. At least one of the probable values of the field may be compared with an actual value of the field of the data. Based on comparison, a notification indicative of a potential error in the data may generated. The data and historical data associated with the data may be processed, based on at least one of predefined rules and a machine learning technique, to detect an anomaly in the data, the anomaly being related to a contextual information associated with the data.

17 Claims, 7 Drawing Sheets

(56) References Cited

U.S. PATENT DOCUMENTS

| | | | | |
|---|---|---|---|---|
| 2013/0332484 A1* | 12/2013 | Gajic | ................ | G06F 16/21 |
| | | | | 707/770 |
| 2015/0301927 A1* | 10/2015 | Pasala | ................ | G06F 11/3684 |
| | | | | 714/38.1 |
| 2017/0063886 A1* | 3/2017 | Muddu | ................ | H04L 41/0893 |
| 2017/0372155 A1* | 12/2017 | Odry | ................ | G06K 9/03 |
| 2018/0173579 A1* | 6/2018 | Potlapally | ................ | G06F 11/079 |
| 2019/0102657 A1* | 4/2019 | SayyarRodsari | .. | G05B 23/0281 |
| 2019/0165941 A1* | 5/2019 | Ray | ................ | H04L 9/006 |

\* cited by examiner

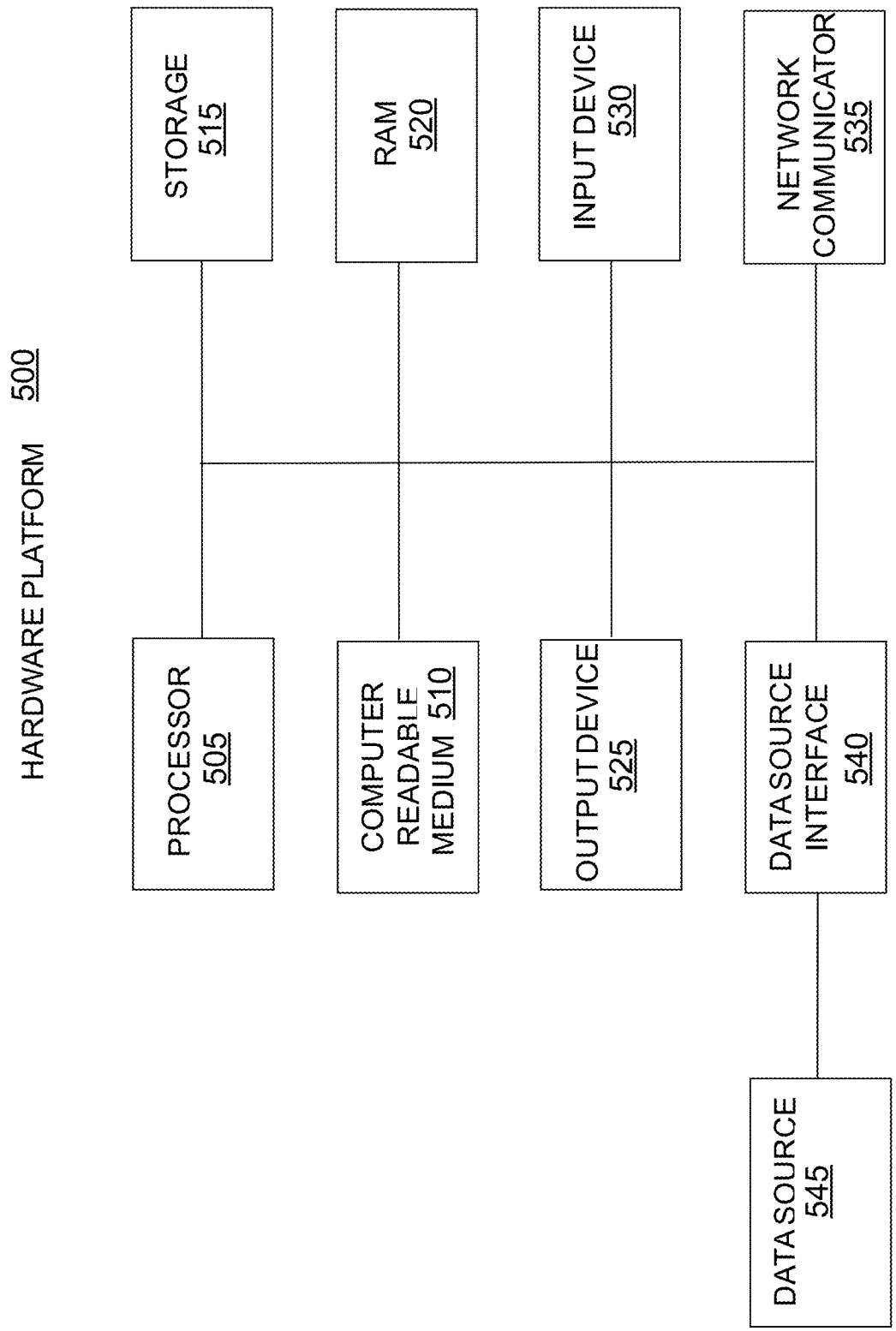

DATA VALIDATION

BACKGROUND

Multiple processes are performed during corporate finance and accounting operations. The processes include data validation, data entry closing, data reconciliation, etc. For example, in corporate financing, the data validation may be performed to validate journal entries in a ledger, such as a general ledger. A journal entry may include data pertaining to a credit entry and data pertaining to a debit entry.

Generally, the purpose of the data validation is to ensure that data in a journal entry is correct and accurate because subsequent processes, such as, for example, reconciliation are based on this data. For instance, an error, intentional or unintentional, may result in future reversal of journal entries and potential restating of financial statements. Moreover, various liabilities such as legal liabilities and financial liabilities, are associated with the revision of a financial statement, i.e., restatement, in case of an error.

Data validation is generally performed at the close of a reporting period, which is generally at the end of the month or the end of the quarter. As a result, an error on day one generally goes unchecked until the end of the reporting period. For instance, each journal entry may include multiple fields, such as an account, and there may be thousands of accounts associated with a ledger. Thus, during validation it may have to be checked if the account (from the thousands of account) mentioned in the journal entry is the correct one. Likewise, similar validation may have to be performed for other fields.

Such cumbersome and complex validation is generally performed using automated systems. However, due to the large volume of data and complex validation process, even with the automated validation substantial human intervention may be required. Moreover, often times, owing to complex rules for data validation and insufficient data, the validation may not be accurate and the errors may be carried forward to other processes.

This presents a technical problem of devising a validation mechanism that may efficiently perform validation of data regularly with required accuracy so that errors are prevented from propagating into in other processes, which may result in wastage of resources (computational and manual).

BRIEF DESCRIPTION OF DRAWINGS

Features of the present disclosure are illustrated by way of examples shown in the following figures. In the following figures, like numerals indicate like elements, in which:

FIG. 5 illustrates a hardware platform for implementation of the validation system, according to an example embodiment of the present disclosure; and FIG. 6a and FIG. 6b illustrates a computer-implemented method for continuous validation, according to an example embodiment of the present disclosure.

DETAILED DESCRIPTION

Figure 1:
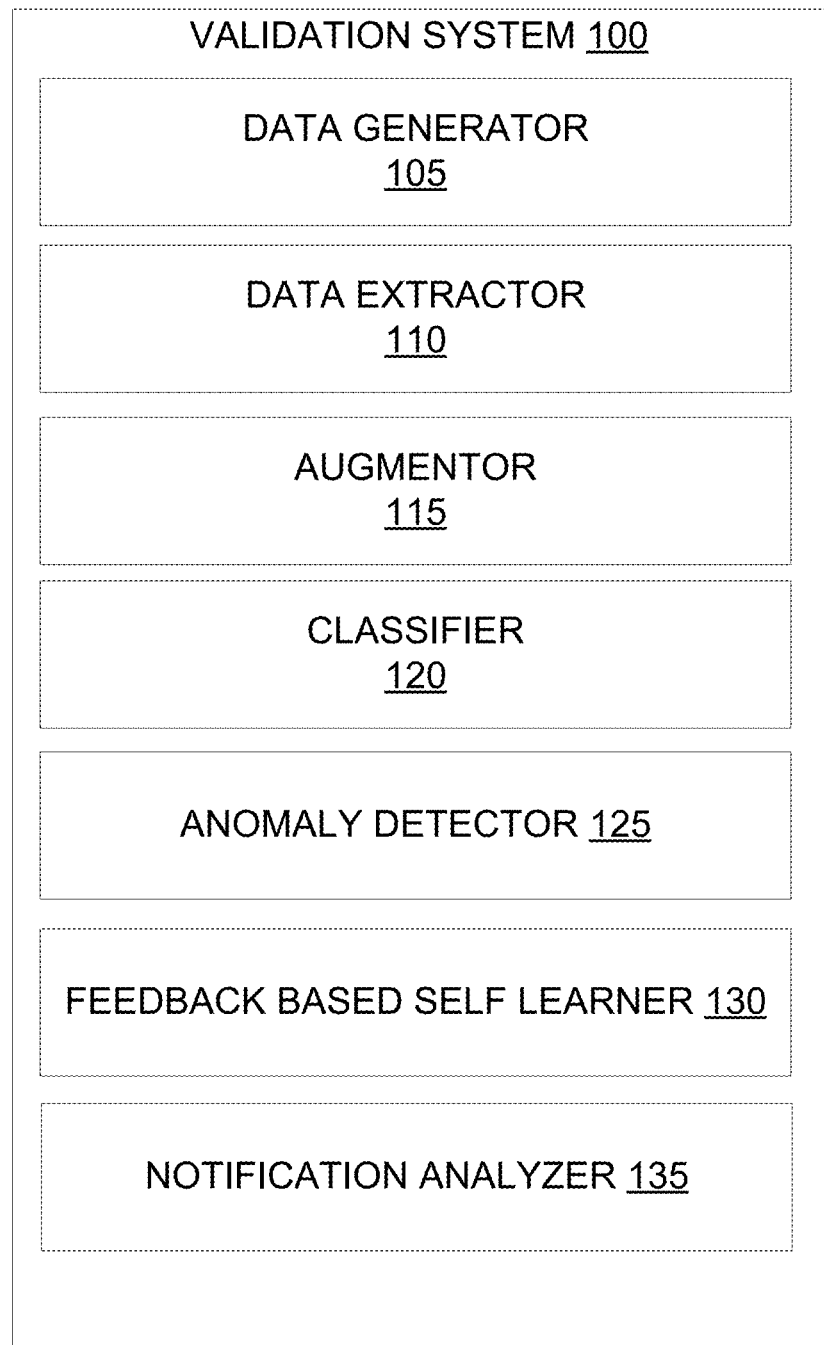
FIG. 1 illustrates a block diagram of a validation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present disclosure describes systems and methods for continuous validation of data, such as financial and accounting data in an organization. The financial and accounting data may include journal entries in a ledger, such as a general ledger of an organization. A journal entry may correspond to a recording of a sale, i.e., creating an invoice/billing to the customer, which may done by creating a debit entry for the account receivable, which is part of asset and creating a credit entry for the sales, which is part of revenue. Likewise, a journal entry corresponding to receiving the payment from the customer, which may be in the form of check, wire transfer or ACH, includes creating a credit entry to the account receivable and a debit entry for a cash/bank account.

According to as aspect of the present disclosure, "continuous" may refer to real-time reconciliation or as soon as a new entry is detected in any of the sources. Thus, as against period end, which is generally on a month or a quarter basis, the validation may be performed on a continuous basis to remedy deficiencies in a timely manner to prevent such errors from propagating further. The present disclosure provides for such continuous validation in an accurate, and time and resource efficient manner with minimum intervention by an external agent, such as, a human resource.

In an example, data to be validated, such as a new journal entry may be received for submission. For instance, a supporting document such as an invoice, a memo, a receipt, a pay in slip, a check, a debit note, a credit note, and a voucher pertaining to the journal entry may be received. Based on the supporting document, a request to post journal entry may be generated. The request, which subsequently becomes the journal entry, includes multiple fields, such as, account details (number and name), which may be validated for errors and anomalies. For instance, an account may be validated against chart of accounts (CoA), which may be understood as a list of all the accounts used in the general ledger of the organization.

In an example, to validate the journal entry, the journal entry and supporting documents may be extracted. The extraction may be performed using automated tools, such as optical character recognition (OCR) tools or may be performed by a user. Upon extracting journal entry and the supporting documents, one or more entities may be extracted. The entities may be understood as features, parameters, or any piece of information that may be associated with a journal entry and may aid in determining fields of the journal entry. The entities include, for example, business logo, address, line item, account number, and price amount. In an example, natural language processing (NLP) techniques may be implemented to extract entities.

Further, data pertaining to extracted entities may be augmented using artificial intelligence and machine learning techniques to enhance accuracy and efficiency of the validation. The augmentation may be performed against augmentation data, which for instance may be pre-stored. The augmentation data may include obtaining contextual details pertaining to various entities from external data sources, such as information available over web, and such details may aid in better identification of CoA and validation. In an example, the augmentation provides for determining the context of various entities to appropriately determine a CoA. For example, in an embodiment, business context may be extracted based on a business logo. In an alternative embodiment, based on an address geo-specific context may be extracted. One of ordinary skill in the art will appreciate that other such alternative embodiments may exist without departing from the scope of the disclosure.

For instance, for a business logo indicating "Starbucks", data pertaining to their products, such as coffee, espresso, etc. may be obtained and stored in augmentation data. Thus, any description including the term "Starbucks" or the name of any of its products, or simply terms, such as coffee, drink, may be grouped under a CoA related to drinks and beverages. In said example, when an entity named "Starbucks" is extracted, the context may be determined to be drinks and beverage. Further, using the augmentation data, other features/terms that can be associated may be determined, which may aid in enhancing the accuracy of subsequent operations.

Upon augmentation, augmented entity data may be classified to determine at least one probable value for a field, such as account and department. In an example, classification may be performed using Naïve Bayesian technique, which may generate a classification model. The classification model may have, for example, a tree structure with each leaf indicating a probable value for the field. One of ordinary skill in the art will appreciate that other techniques that allow continuous updating of the classification model as new information comes into a validation system to enhance accuracy may also be used. In an example, the classification may be performed using vendor name (extracted entity) to determine an associated account. In case of multiple accounts being associated with a vendor, additional description associated with the vendor name (augmented entity data) along with the vendor name may be used to determine one or more probable accounts. A probability score may be associated with each of the one or more accounts and the probable accounts may also be ranked, based on the probability score. In an example, the probability score may be calculated, based on a frequency of a charge occurring in past. For instance, if a charge, i.e., a journal entry appears more than a threshold number of times, there's a higher likelihood of the charge appearing again, and therefore, it may have a higher probability score. In addition to account, other fields, such as department, may also be determined during classification.

Upon classification, the classified fields, such as account and department, may be validated against a CoA standard combination. In case of a mismatch, a notification indicating a probable error may be generated.

The validation may not include determination of potential errors in the journal entries but may also include detection of anomalies in the journal entry may be performed, using machine learning prediction techniques. An anomaly may be a deviation from a predefined behavior of the journal entry. The anomaly detection may be used to validate whether there is any reason to suspect that there are potential unintentional or intentional errors in the journal entry. The anomaly detection may provide for detection of an error in one of behavioural aspects, which is indicative of contextual information associated with the data. The contextual information may include information pertaining to context of data, such as inputs to, five W's: who, what, when, where, and why. So, an error related to a user posting a journal entry (who) or an error related to time of positing a journal entry (when) may be detected.

The anomaly may be a semantic anomaly, an outlier anomaly, or a rule-based anomaly. A rule-based anomaly may be triggered when value of a journal entry entity or field is contradictory to predefined anomaly detection rules. For instance, when an amount for a particular class is not as per a predefined rule. An outlier-based anomaly may be triggered when a journal entry is not within a standard statistical range. For instance, an outlier anomaly may be detected when an amount for given a class/type is beyond a threshold. A semantic based anomaly is detected, when the description of a journal entry is not semantically similar to corresponding historical data.

Accordingly, based on predefined anomaly detection rules and criteria, an anomaly in the journal entry may be detected to validate the journal entry. During validation, values of fields, such as, account and department number determined earlier, while classification, may be used for validation. Thus, various operations, such as augmentation, classification, and anomaly detection may be performed to validate journal entries. Further, the validation may be performed as soon as a new journal entry is received for real-time validation. Alternatively, the validation may be performed at time configured by a user, such as end of day, instead of waiting till end of reporting period. Thus, the present system offers the flexibility of performing data validation in real-time or later, to prevent errors being propagating to other entries or financing and accounting operations.

The augmentation provides for enhancing the classification efficiency, thereby minimizing human intervention. Even in the cases, where assistance from a user may be required, such assistance may be simple and may include selection of one of limited options as against a user having to perform analysis with respect to a large volume of data. Further, because the errors may be substantially reduced, the computational resources may be better utilized owing to minimization of rework and reprocessing. The anomaly detection provides for detection of fraudulent entries, which otherwise may have gone unchecked.

Thus, the present disclosure provides a comprehensive system for validation of journal entries in a time and resource efficient manner. The present disclosure offers a tool that is flexible yet capable of handling complex continuous validation. Thus, the present disclosure provides a comprehensive, flexible, economic, and time-effective approach for continuous validation.

FIG. 1 illustrates a validation system 100 for reconciling data, such as financial and accounting data, in an organization, according to an example embodiment of the present disclosure. In an example embodiment, the validation system 100, hereinafter referred to as system 100, uses a combination of Artificial Intelligence (AI) and machine learning techniques to perform a variety of operations associated with validation.

In an example, the system 100, amongst other components, includes a data generator 105, a data extractor 110, an augmentor 115, a classifier 120, an anomaly detector 125, a feedback based self learner 130, and a notification analyzer 135.

The system 100 provides for continuous validation of data, such as journal entries in a ledger. In an example, the ledger may be a general ledger or a sub-ledger. A general ledger may be for an over-all account of an organization, providing a holistic view of the organizations financial status. A sub-account of an account corresponding to a general ledger may have a sub-ledger. For instance, an account dealing with salaries, an account dealing with on-site budgets, or an account dealing with meals, may each have a separate sub-ledger. In another example, separate units/departments may also have separate sub-ledgers.

In an example embodiment, the data generator 105 may receive a request for journal entry posting. The journal entry request may include one or more supporting documents, based on which the journal entry may be created. In other words, documents that serve as a source of a journal entry may be referred to as supporting documents. The supporting documents include, for example, an invoice, a memo, a receipt, a pay in slip, a check, a debit note, a credit note, and a voucher. The data generator 105, in an example, may also determine a type of the supporting document prior to extracting information from the supporting document.

Based on the details from the supporting documents, data in a pre-defined format for a journey entry in a ledger may be generated. A journal entry corresponding to the recording of a sale, i.e., creating an invoice/billing to the customer, may include creating a debit entry for the Account Receivable account (part of asset) and creating a credit entry for the sales (part of revenue). Subsequently, a journal entry corresponding to receiving the payment from the customer, which may be in the form of check, wire transfer, or ACH, includes creating a credit entry to the Account Receivable account and a debit entry for the cash/bank account.

A journal entry may include, fields to be validated, amount, account, and department. The department may indicate a unit or department the journal entry belongs too. An account may be one of the accounts in a CoA of an organization.

The CoA may be a list of all the accounts used in the general ledger of the organization. The CoA may include a hierarchy of accounts, for instance, at top may be accounts associated with partners, the accounts associated with various finance related accounts, such as costs, sales, and investments, accounts related to various departments, such as front office and café.

It may include other fields as well, such as date and entry number. Further, based on the supporting document, various fields may be determined and a journal entry may be generated. The data generator 105 may convert the journal entry into a standard format, such as, json, for appropriate subsequent analysis. Further, based on CoA of an organization, the journal entry may be classified, which may be validated during subsequent validation.

In an example, the generated journal entry may be validated in real time. In other examples, the journal entry may be validated after a pre-configured period, which may or may not map to a reporting period. To perform the validation, the data extractor 110 may extract the journal entry and associated supporting documents. In an example, the data extractor 110 may continuously poll the ledger to detect generation of new accounting event indicating generation of a new journal entry. The polling period may be configurable. In case of real-time validation, the polling may be continuous, while in other cases it may set to a day, a week, or so on. Alternatively, the data generator 105 may provide a notification every time a new journal entry is generated.

The data extractor 110 may obtain data, i.e., the journal entry to be validated and supporting documents using tools, such as OCR tools. Thus, the data extractor 110 may process electronic copies of the supporting documents to extract relevant data. Alternatively, a user may digitally provide the required data.

Upon obtaining the journal entry and the supporting document, the data extractor 110 may extract one or more entities associated with the journal entry. The information pertaining to the entities may be used in subsequent steps of validation, such as classification. The entities may be indicative of features of the journal entry, such as business, location, description, etc. The entities may include, for example, business logo, address, line item, account number, and amount details (price). The data extractor 110 may implement various NLP techniques, such as: ngrams frequency to extract features/entities from the line descriptions.

The extracted data (entities) may be augmented by the augmentor 115 to enhance accuracy using augmentation data. The augmentation data may include data associated with various systems and sources, such as vendor or client master database, data, which may be purchased from data providers, such as *Nexus* Lexus™ or publicly available data from the Internet. The augmentor 115 may aid extraction of more features similar to extracted entities, based on context. For instance, augmentation of business logo may provide context of business, address may be augmented to obtain geo-specific context, PO# may be augmented to obtain original PO, line item may be augmented to obtain business context and emails, and price may be augmented to determine business context and emails.

Thus, to generate augmentation data, the augmentor 115 may access various sources and extract relevant data to be stored in the augmentation data. For instance, if vendor name (entity) indicates "McD", the augmentor 115 may crawl the web to extract data, such as product range of McD so that if any of the products appears in the journal entry, it may be appropriately identified under an account associated with food.

The augmentor 115 to augment the extracted data may either used pre-stored augmentation data or may extract augmentation data in parallel. To enhance efficiency, the augmentor 115 may store details pertaining to common entities, such as vendors. Further, in cases where extracted data may itself be sufficient for classification, augmentation may be skipped.

In case augmentation is performed, augmented extracted data may be processed by the classifier 120 to perform classification of the one or more fields, such as, department and account. In cases where augmentation is not performed, extracted data may be used. For the sake of brevity, classification is explained w.r.t. augmented extracted data, it will be appreciated that similar principles may be extended to classification using the extracted data.

In an example, the classifier 120 may implement machine learning and artificial intelligence based techniques for classification. For example, the classifier 120 may implement probabilistic classifier based machine learning technique, such as Naïve Bayesian classification based machine learning technique.

Naïve Bayes is based on applying Bayes' theorem with the "naive" assumption of independence between every pair of features. Given a class variable "y" and a dependent feature vector "$x_1$" through "$x_n$," Bayes' theorem states the following relationship:

$$P(y \mid x_1, \ldots, x_n) = \frac{P(y)P(x_1, \ldots x_n \mid y)}{P(x_1, \ldots, x_n)} \quad (1)$$

Using the naive independence assumption that $$P(x_i \mid y, x_1, \ldots, x_{i-1}, x_{i+1}, \ldots, x_n) = P(x_i \mid y) \quad (2)$$

for all "i" this relationship is simplified to:

$$P(y \mid x_1, \ldots, x_n) = \frac{P(y) \prod_{i=1}^{n} P(x_i \mid y)}{P(x_1, \ldots, x_n)} \quad (3)$$

Since $P(x_1, \ldots, x_n)$ is constant given the input, the following classification rule may be used:

$$P(y \mid x_1, \ldots, x_n) \propto P(y) \prod_{i=1}^{n} P(x_i \mid y) \quad (4)$$

$$\Downarrow$$

$$\hat{y} = \arg\max_{y} P(y) \prod_{i=1}^{n} P(x_i \mid y),$$

and Maximum A Posteriori (MAP) may be used to estimate P(y) and $P(x_i|y)$; the former is then the relative frequency of class "y" in the training set.

Using Naïve Bayesian technique, the classifier 120 may be trained on cleaned data for past years (historic data), extract features/entities (n-grams frequency features, word counts, matching similarity with COA, etc.), and training a naïve model based on the extracted features. The cleaned data may refer to data, which may be appropriately formatted and may free from any information that may not be useful, while classification. In an example, the extracted entities may be provided by data extractor 110. The trained model may then be used for future classifications.

The classification may be understood with the help of an example.

Consider that the classifier 120 has required historical data, the classier 120 may build a Naïve Bayes model that provides the probability of output account and department predictions for different set of input features:
1) Given the features "coffee, bagel, Starbucks", the classifier 120 may determine that likelihood of the account number being 98764, is 65%. Thus, the probability score for account 98764 when features include coffee, bagel, and Starbucks is 0.65.
    P(98764| coffee, bagel, Starbucks)=0.65
2) The probability score for account 98764 when features include Starbucks is 0.38.
    P(98764| Starbucks)=0.38
3) Based on augmentation, more features may be added. The probability score for account 98764 when features include coffee, bagel, Starbucks, drinks, chocolate, and espresso is 0.82.
    P(98764| coffee, bagel, Starbucks, drinks, chocolate, espresso)=0.82

The classifier 120 may provide multiple probable accounts same set of features/entities. In said example, the classifier 120 may determine another account 98732 with the same set of features, viz. coffee, bagel, Starbucks, drinks, chocolate, and espresso.

P(98732| coffee, bagel, Starbucks, drinks, chocolate, espresso)=0.08

Thus, the classifier 120 may provide a final classification model, which may be a tree network of probabilities that routes a set of features to leaves of the tree. Further, as can be seen, higher the number of features, higher is the probability. Thus, augmentation performed earlier may aid in extraction of more features to enhance accuracy.

It will be appreciated that the classification has been explained with help of the above example only for the purpose of explanation and not as a limitation. The system 100 may implement classification with more complicated rules, based on the principles described herein. For instance, in addition to what features are being used, the order of features and the count may also be considered. Similar to account or CoA classification, the classifier 120 may perform classification of department pertaining to the journal entry. The classifier 120 is explained in further detail with reference to description of FIG. 2.

In case of multiple probable values for a field may be generated as in the example above, typically the one with highest probability score may be selected for subsequent comparison. In another example, all the fields with probable score greater than threshold may be selected. Alternatively, assistance from an external agent may be requested. In case external assistance is requested, the external agent's input may be gathered by the feedback based self learner 130 to update rules and/or educate the classifier 120.

The classified output, which may include one or more of journal entry fields, may be compared against actual journal entry to determine if there is an error. In case the fields in the classified output are different than the actual journal entry, a notification may be generated. In an example, the notification may be provided to the notification analyzer 135, which may provide for investigation of the error and remedial action, if any. In other example, the notification may be provided to a user. This way fields, such as account and department in the journal entry may be validated.

According to an aspect of the present disclosure, the validation also include anomaly detection. The anomalies may include, for example, rule based anomalies, outlier based anomalies, and semantic anomalies, as will be explained in detail with reference to description of FIG. 4. Such anomalies, in addition to unintentional errors, may also aid in identification fraudulent entries by analyzing behaviour aspects, i.e., who, when, where, why, and what. In an example, the anomaly detector 125 may perform anomaly detection using machine learning techniques and rule based techniques.

The anomaly detector 125 may include predefined rules for each of the operations to be performed. The rules may be implemented in conjunction with machine learning techniques. Further, the anomaly detector 125 may also generate a behavior model for each of the account (of the chart of account) at both the ledger and sub-ledger levels. The behavior models may include who within an organization submit and/or approve the journal entries, when they submit, how do they submit, etc. These models may be used at subsequent processing to validate whether there is any reason to suspect there are potential unintentional or intentional mistakes to be committed.

For instance, the anomaly detector 125 may determine "who" generated the journal entry. The anomaly detector 125 may summarize journal entries by the persons entering to determine if they're authorized. Further, it may be determined how often do the person post in a given time period, say in last one year. This may help in detecting entries by people who generally don't post and are now posting, so it may be cross-checked if they are authorized or the entry is a valid one.

The anomaly detector 125 may determine "what" the journal entry pertains to. The anomaly detector 125 to determine "what" aspect may extract nonstandard or manual journal entries versus system entries, such as an accounts payable ledger posting for further analysis. Further, a size of journal entries based on amount using the debit side of the transaction may be stratified. The journal entries may also be summarized by general ledger account to identify repetitive and unique account sequences used in the journal entry based on the first few, say, five, debit and credit account postings. The anomaly detector 125 may also summarize general ledger activity on the amount field, absolute value of debit or credit, to identify the top occurring amounts. Further, the anomaly detector 125 may scatter graph general ledger account, debit and credit amounts separately and numbers of transactions.

Likewise, the anomaly detector 125 may determine "when" was the journal entry generated. The "when" aspect doesn't necessarily only include the date, but considers other aspects as well, such as holidays, fiscal year end, etc, to determine any irregularity. For the purpose, the anomaly detector 125 may extract journal entries posted on weekends and holidays. Holidays may include organization's fixed holidays or a user's vacation. The anomaly detector 125 may also extract journal entries relating to the prior year that were made just immediately following a fiscal year-end. Further, journal entry credits and debits processing by day, month and year may be summarized.

The anomaly detector 125 may determine "where" the journal entry was generated. The anomaly detector 125 may extract journal entries made to suspense accounts and summarize by the person entering and corresponding account numbers. The anomaly detector 125 may extract journal entries to general ledger accounts known to be problematic or complex, based on past issues, such as errors of accounting in journal subsequently corrected by accounting staff or auditors, at the company or the industry in general. Further, debits in revenue may be extracted and summarized by general ledger account. Also, the system 100, for instance, the data generator 105, may also capture a location of the generation of journal entry, which may be used by the anomaly detector 125 to determine if the journal entry was generated from a remote or a suspicious location.

The anomaly detector 125 may also determine "why" the journal entry was generated. The anomaly detector 125 may extract general ledger transaction amounts (debit or credit) that exceed the average amounts for that general ledger account by a specified percentage. For example, five times the average. Further, journal entries that equate to round multiples of 1,000, 10,000, 100,000, 1,000,000 and so on may be extracted. In other example, other figures may be defined. The anomaly detector 125 may also extract journal entries with key texts such as "plug" and "net to zero" anywhere in the record. The journal entries that are made below set accounting department approval limits, especially multiple entries of amounts below such limits, may also be extracted. The anomaly detector 125 may also extract journal entries that don't net to zero (debits less credits).

On detection of an anomaly, the anomaly detector 125 may generate a notification indicating a probable erroneous journal entry. Based on the notification and associated data provided by the anomaly detector 125, the notification analyzer 135 may further analyze the anomaly. In other examples, the notification may be provided to an external agent, who may provide inputs indicating whether the journal entry is correct or incorrect. The inputs from the external agent may be ingested by the feedback based self learner 130 to further update the rules implemented by the anomaly detector 125.

Thus, the anomaly detector 125 may aid for detection of irregularities or unusual journal entries, which may otherwise would have been difficult to detect among thousands of entries. Thus, the present disclosure not only provides for validating fields that are in a journal entry (by way of classification) but also provides for detecting fraudulent entries with accuracy.

In case of a journal entry not being validated, either based on classification or anomaly detection, the notification analyzer 135 may launch autonomous investigation, which may request inputs from external agents through a dialog manager, such as an email or chat. The autonomous investigation may start with hypothesis generation, and each of the hypothesis may then be associated with a "plan" to validate whether it is true or not. The hypothesis may be based on analysis of previous journal entries and machine learning tools. If the hypothesis that there are mistakes in the journal entry is true, a remediation may be triggered including the rejection of the journal entry and/or with recommended amendment and/or escalate to an external agent for further investigation. Further, the inputs from the external agents may be processed by the feedback based self learner 130 to further refine the validation process.

Figure 2:
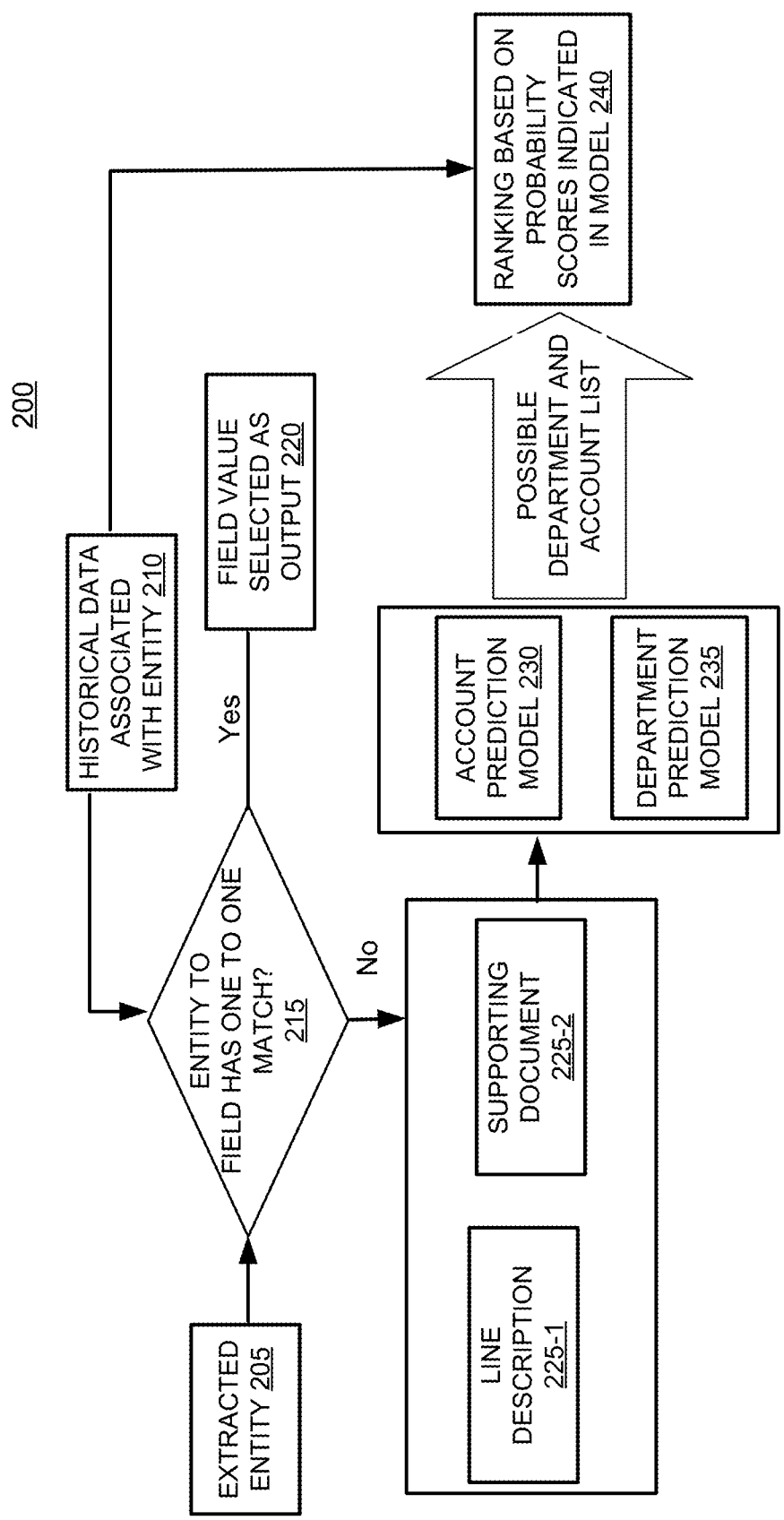
FIG. 2 illustrates an example process for classification performed by the validation system, according to an example embodiment of the present disclosure.

FIG. 2 illustrates an example classification process 200 implemented by the classifier 120, according to embodiment of the present disclosure. The classifier 120 may implement machine learning techniques and artificial intelligence techniques, for instance, Naïve Bayesian method. The classification process 200 illustrates classification of an account and a department for a journal entry. The errors in account may be for a variety of reasons, for instance, short descriptions, human entered descriptions, which are not legible, description not being related to an invoice, different account numbers having same description, multiple vendors per journal entry record, overlapping description, where one description includes description of other accounts. Similarly, for a variety of reasons, department, and other fields may be not be correctly entered during journal entry generation.

In an example, the classification process 200 initiates at block 205, where extracted entity, say, vendor name be obtained. The classifier 120 may obtain historical data pertaining to the vendor as indicated at block 210. The historical data may include, for instance, name of vendors and previously submitted journal entries by the vendors. Based on the historical data, at block 215, it may be determined if there is a single account associated with the vendor, i.e., if there is a one to one match. In case there is a one to one match, the corresponding account (value of field) is provided as output, i.e., the classified output at block 220. However, if at block 215, it is determined that the vendor has multiple accounts, at block 225-1 line description and at block 225-2 supporting document, such as an invoice may be obtained. The classifier 120 using naïve Bayesian method may generate a classification model for account, an account prediction model 230, and a classification model for department, a department prediction model 235.

As mentioned above, based on the probability scores, each probable value for a field may be ranked in the classification model as indicated at block 240. The classified output may be provided to a user or may be used by the classifier 120 for comparison with actual values of fields of the data in the journal entry.

Figure 3:
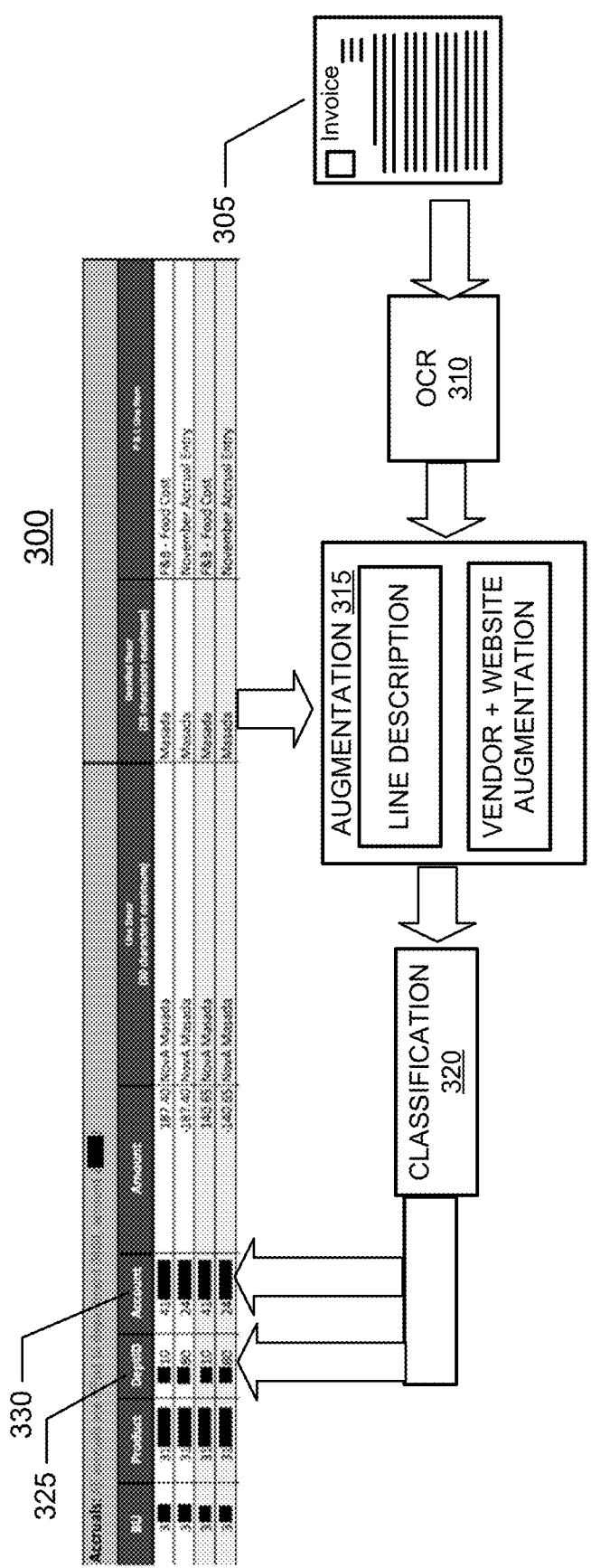
FIG. 3 illustrates an example of classification performed by the validation system, according to an example embodiment of the present disclosure.

FIG. 3 illustrates an example 300 of classification performed by the system 100, according to an example of the present subject matter. In an example, a supporting document 305, such as an invoice may be received. Upon receiving, entity extraction may be performed. For instance, at block 310, OCR may be performed to extract entities. At block 315, augmentation may be performed. For instance, line description from the journal entry may be used to identify vendor; and using vendor name and associated website augmentation may be performed. At block 320, classification may be performed using augmented output. The classification may indicate probable department and account, which may be matched with the department, such as department ID 325 and the account 330 in the journal entry.

Figure 4:
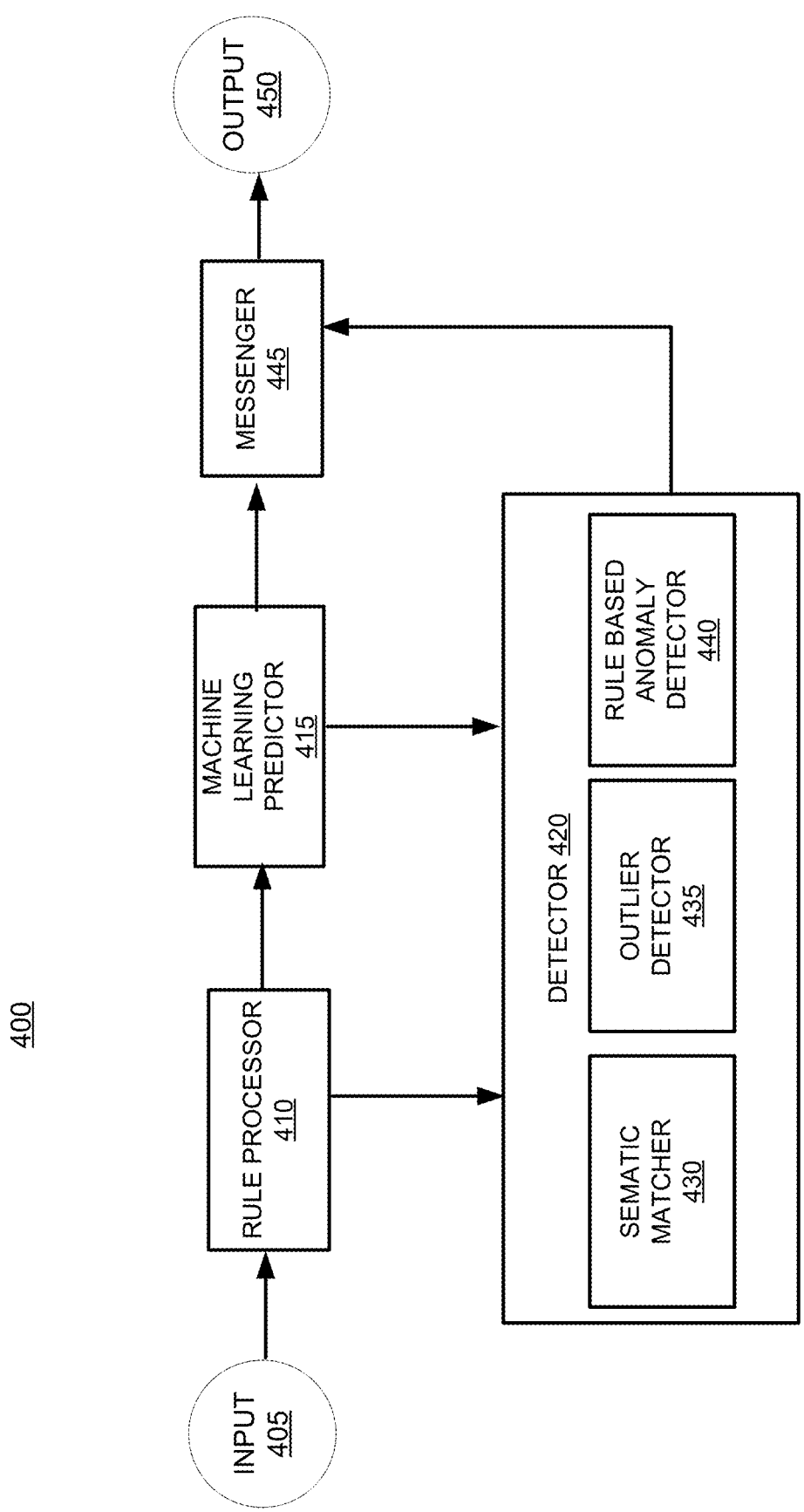
FIG. 4 illustrates a block diagram for anomaly detection; according to an example embodiment of the present disclosure.

FIG. 4 illustrates a block diagram 400 for anomaly detection performed by the system 100, according to an embodiment of the present disclosure. At block 405, journal entry may be received as an input. The journal entry may be in JSON format. The input may be processed using predefined rules by a rule processor 410 and/or machine learning predictor 415. Based on the predefined rules, at least one of the rule processor 410 and the machine learning predictor 415 may determine probable irregularities.

The rule processor 410 may be used to check journal entries against predefined accounting rules. For example, the rule processor 410 may be used to determine items requiring access to historical application programming interfaces (APIs) for past months and access to bank accounts to check the account balance. The rule processor 410 and the machine learning predictor 415 may be account match validation, account line description validation, account invoice semantic validation, and items containing support documents.

The machine learning predictor 415 may use data pertaining to journal entries and validate the data in the journal entry against machine learning predictions. For instance, the machine learning predictor 415 may determine a vendor name and charge description and may predict values of various fields, such as an account and a department. Subsequently, it may be ascertained whether the fields inserted by the user in the journal entry are matching with the predictions or not.

The rule processor 410 and the machine learning predictor 415 may be used in combination or separately For instance, the rule processor 410 and the machine learning predictor 415 may validate behaviour aspects of the journal entries (including who, where, when, what, how) against a combination of knowledge driven and data driven approaches.

For instance, a rule may indicate that sum of amounts in journal template should always be zero unless it is a statistical account. Accordingly, the rule processor 410 and the machine learning predictor 415, may identify all the paired line items from a journal template. Further, unpaired line items, which have an account number starting from say, "x", may be identified where all the statistical account start with "x".

In another example, the rule processor 410 may determine accounting facts that a journal entry should follow. For example, a journal entry of type re-class may only be charged to accounts starting with a particular series, say, "xx", so the rule processor 410 may determine if all re-classes are according to this specific rule. The rules may be learned from examples and rule programmatic applications.

The output from the rule processor 410 and the machine learning predictor 415 may be provided to a detector 420. The detector 420 may include, for instance, a semantic matcher 430 to detect semantic anomalies, an outlier detector 435 to detect outlier anomalies, and a rule based anomaly detector 440 to detect rule based anomalies.

The semantic matcher 430 may detect a semantic anomaly, when the description of a journal entry is not semantically similar to historical data. For example, if the description of a charge submitted to the food account is not semantically close to any of the previously submitted journal entries.

The outlier detector 435 may detect an outlier anomaly when a journal entry is not in the standard statistical range. For example, the Gaussian distribution of laundry charges may be calculated based on historical data and the average value of charges may be $290 with a variance of $50. A new laundry charge, which has the amount of $500 may trigger anomaly flag since the charge amount is out of the range for the specific account.

The rule based anomaly detector 440 may detect an anomaly when a journal entry property does not fit into pre-defined acceptable range, i.e. anomaly detection rules. These rules are defined may be defined by a user, such as an industry experts. For example, if the journal entry values are a round multiple of 10, i.e. 1000, 10000 etc., then it may be a potential abnormal/fraud value.

In case an anomaly is detected, a trigger may be provided to a messenger 445, which in turn may generate output 45, such as, a notification with associated data, which may be in JSON format. The notification may be received by the notification analyzer 135, which may then determine probable reasons for anomaly and if available, a remedial action.

In another example, the messenger 445 may receive an input from the machine learning predictor 415 to generate the notification in case an error is detected by the machine learning predictor 415. For example, in addition to notification being generated based on detection of anomalies by various detectors 430, 435, and 440, a notification may be generated by the machine learning predictor 415, when an account/departments combination is incorrect or is not according to the CoA.

FIG. 5 illustrates a hardware platform 500 for implementation of the system 100, according to an example of the present disclosure. In an example embodiment, the hardware platform 500 may be a computer system 500 that may be used with the examples described herein. The computer system 500 may represent a computational platform that includes components that may be in a server or another computer system. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 500 may include a processor 505 that executes software instructions or code stored on a non-transitory computer readable storage medium 510 to perform methods of the present disclosure. The software code includes, for example, instructions to obtain data, reconcile data, generate confidence score, and perform summarization. In an embodiment, the data generator 105, the data extractor 110, the augmentor 115, the classifier 120, the anomaly detector 125, the feedback based self learner 130, and the notification analyzer 135 are a software code or a component performing the above steps.

The instructions on the computer readable storage medium 510 are read and stored the instructions in storage 515 or in random access memory (RAM) 520. The storage 515 provides a large space for keeping static data where at least some instructions could be stored for later execution. The stored instructions may be further compiled to generate other representations of the instructions and dynamically stored in the RAM 520. The processor 505 reads instructions from the RAM 520 and performs actions as instructed.

The computer system 500 further includes an output device 525 to provide at least some of the results of the execution as output including, but not limited to, visual information to users, such as external agents. The output device can include a display on computing devices. For example, the display can be a mobile phone screen or a laptop screen. GUIs and/or text are presented as an output on the display screen. The computer system 500 further includes input device 530 to provide a user or another device with mechanisms for entering data and/or otherwise interact with the computer system 500. The input device may include, for example, a keyboard, a keypad, a mouse, or a touchscreen. In an embodiment, output of the intelligent risk management agent is displayed on the output device 525. Each of these output devices 525 and input devices 530 could be joined by one or more additional peripherals.

A network communicator 535 may be provided to connect the computer system 500 to a network and in turn to other devices connected to the network including other clients, servers, data stores, and interfaces, for instance. A network communicator 535 may include, for example, a network adapter such as a LAN adapter or a wireless adapter. The computer system 500 includes a data source interface 540 to access data source 545.

Figure 6A:
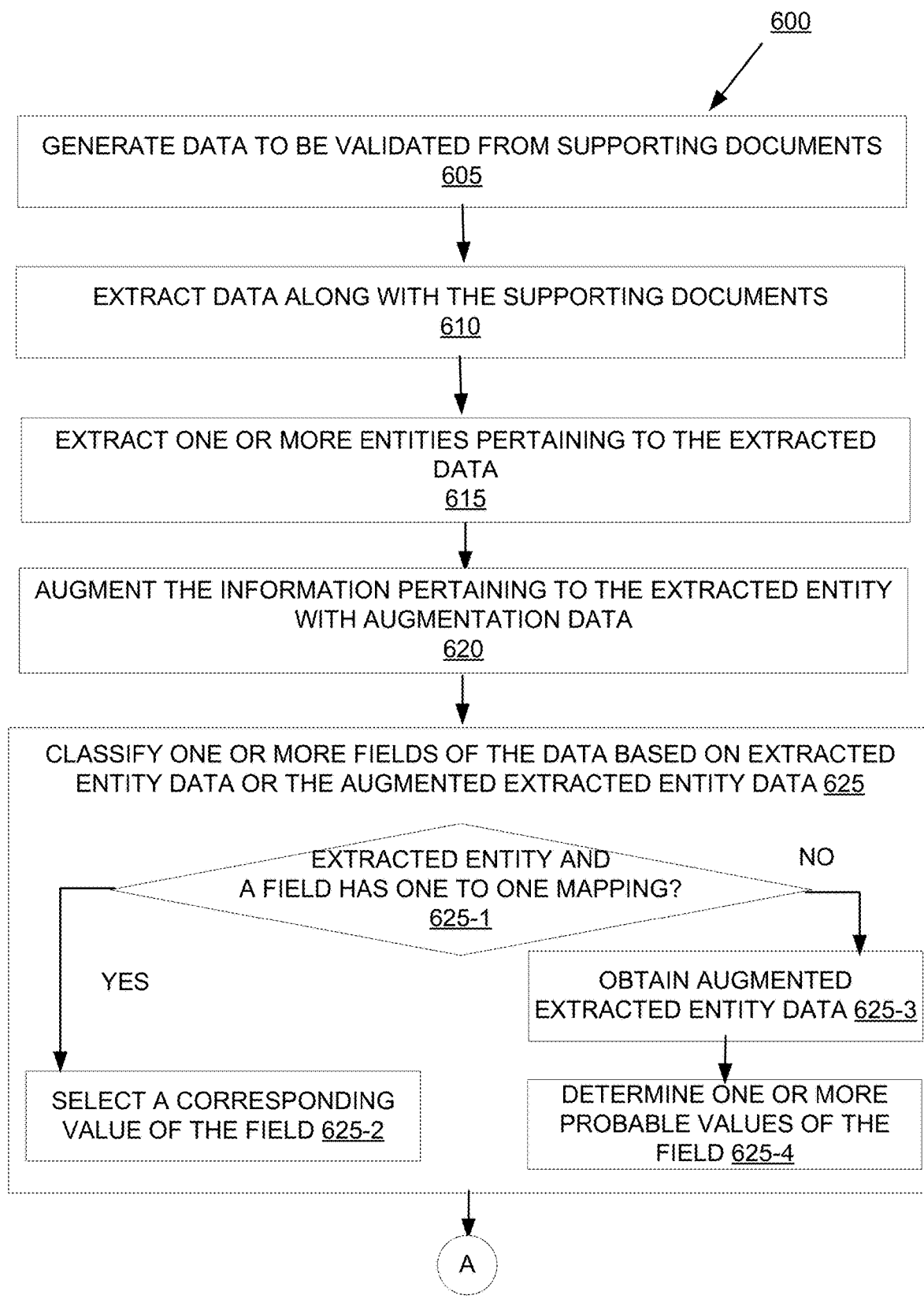
Figure 6B:
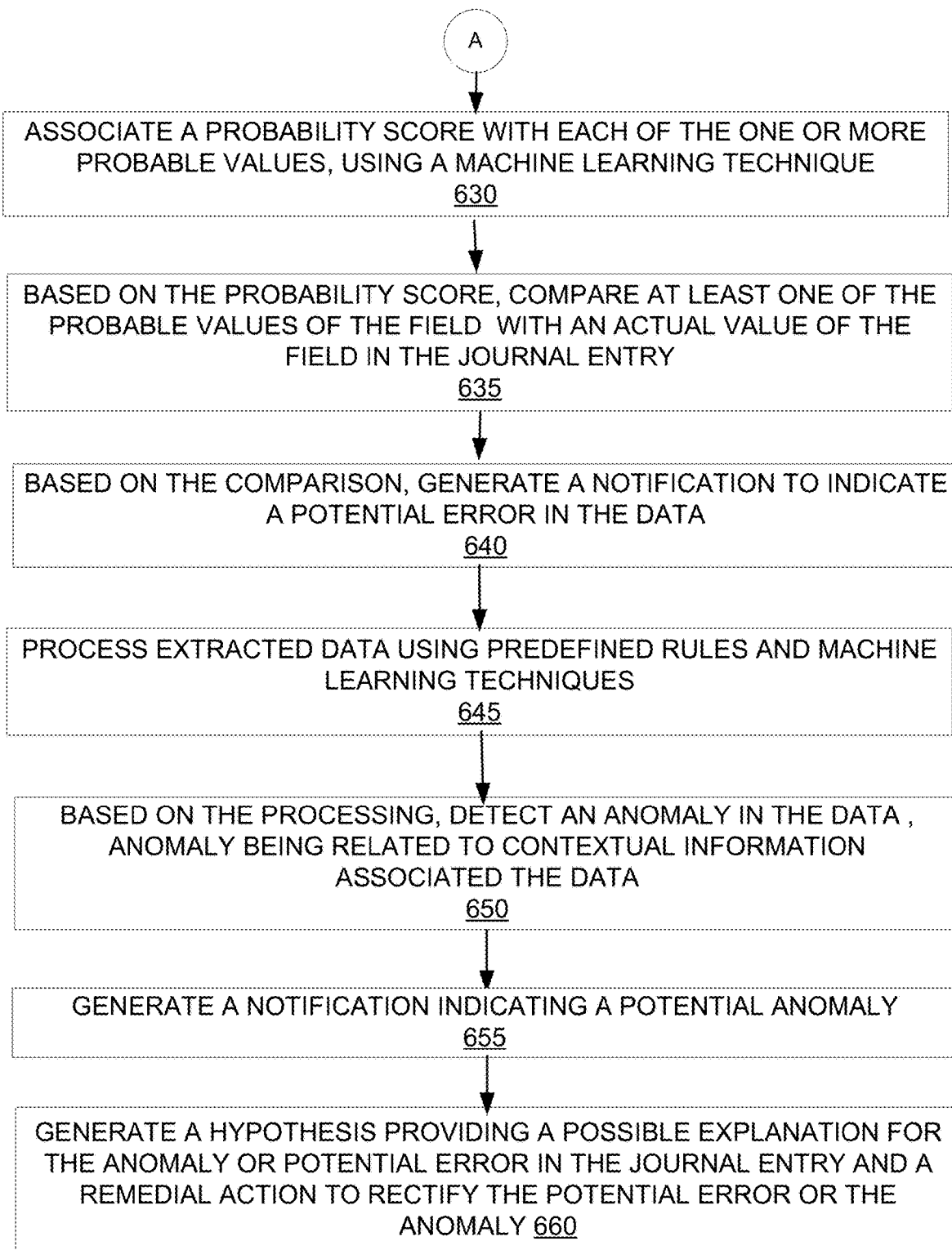

FIG. 6a and FIG. 6b illustrates a computer-implemented method 600 depicting functionality of the system 100, according to an example embodiment of the present disclosure. For the sake of brevity, construction and operational features of the system 100 which are explained in detail in the description of FIG. 1-FIG. 5 are not explained in detail in the description of FIG. 6.

At method block 605, the method 600 commences by generating data to be validated, such as journal entry in a ledger. The data may be obtained from supporting documents, such as invoices, receipts, and checks. In an example, the data extractor 105 may generate the data.

At block 610, the data along with supporting documents may be extracted. In an example, the data extractor 110 may extract the data using OCR techniques or based on inputs provided by a user.

At block 615, one or more entities pertaining to the extracted data may be extracted. An entity may relate to a feature of the data, such as vendor name. In an example, the data extractor 110 may extract the entities using NLP techniques. The information pertaining to entities may aid in determining values of various fields of the journal entry.

At block 620, the information pertaining to the extracted entity may be augmented with augmentation data, which includes information pertaining to fields of the data from external sources, such as external databases, information over the web, etc. The augmentation provide for determining features relevant to or similar to the extracted entity. In an example, the augmentor 115 may augment the extracted entity to provide augmented extracted entity data.

In other examples, where information pertaining to the extracted entity data may be sufficient, augmentation may not be performed. For instance, in case where there is a single value of a field mapping to the extracted entity.

At block 625, based on extracted entity data or the augmented extracted entity data, one or more fields, such as account and department, of the journal entry may be classified. The fields may be relate to data that is: to be validated, is prone to errors, or is critical to subsequent financing processes, such as reconciliation. In an example, the classifier 120 may perform the classification of the fields using machine learning techniques, such as Naïve Bayesian technique.

To perform the classification, at block 625-1, it may be ascertained whether the extracted entity and a field (which is to be classified) have a one to one mapping. For instance, it may be ascertained if a vendor name (extracted entity) have a single account (field) associated with it.

At block 625-2, when the extracted entity and the field have a one to one mapping, a corresponding value of the field is selected as a probable value, interchangeably referred to as value, of the field.

When the extracted entity and the field do not have the one to one mapping, the augmented extracted entity data may be obtained at block 625-3.

At block 625-4, the augmented extracted entity data may be processed to determine one or more probable values of the field.

At block 630, a probability score may be associated with each of the one or more probable value, based on the features (obtained on augmentation) or extracted entity, using a machine learning technique. The probability score is indicative of a likelihood of the determination of the probable values being correct. In an example, the classifier 120 may determine the probabilities scores. Further, the classifier 120 may also generate a classification model, where each leaf may indicate a set of input features and associated probable score.

At block 635, based on the probability score at least one of the probable values of the field is compared with an actual value of the field in the journal entry. In an example, the classifier 120 may perform the comparison. For instance, the classifier 120 may select the probable value with highest score, all the probable values greater than a predefined threshold, or a probable value selected by a user.

At block 640, based on the comparison, a notification may be generated to indicate a potential error in the data, i.e., journal entry, for instance, in case the probable value does not match with the actual value of the field in the journal entry. In an example, the classifier 120 may generate the notification.

At block 645, extracted data, i.e., journal entry may be processed using predefined rules and machine learning techniques. The processing may involve comparison against predefined rules and historical data pertaining to the entries of the journal entry. In an example, the anomaly detector 125 may process the extracted data. The anomaly detection and the classification may be performed in any sequence or may be performed in parallel.

At block 650, based on the processing, an anomaly in the journal entry may be detected. In an example, the anomaly detector 125 may determine whether a description of the journal entry is semantically similar to corresponding historical data to detect a semantic anomaly. The anomaly detector 125 may determine whether the journal entry is in the standard statistical range to detect an outlier anomaly and may determine whether a journal entry property fits into a pre-defined acceptable range to detect a rule based anomaly.

At block 655, a notification indicating a potential anomaly may be generated. In an example, the anomaly detector 125 may generate the notification.

At block 660, a hypothesis providing a possible explanation for the anomaly or potential error in the journal entry and a remedial action to rectify the potential error or the anomaly may be generated. In an example, the notification analyzer 135 may provide the hypothesis and the remedial action.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A validation system comprising:
a processor;
a data extractor coupled to the processor to,
extract data to be validated and associated supporting documents, the data including a journal entry in a ledger stored in a database, wherein validation of the data includes reconciliation of the journal entry in the ledger to identify a potential error and an anomaly indicative of a deviation from a predefined behavior in the journal entry, and wherein the reconciliation is performed continuously in near-real time, in response to detection of a new journal entry in the database; and
extract an entity associated with the data stored in the database using a natural language processing technique, the entity being indicative of a feature of the data associated with the journal entry in the ledger;
a classifier coupled to the processor to:
determine a value for a field of the data corresponding to the journal entry, based on the extracted entity, the field of the data including information to be validated;
ascertain whether the extracted entity and the field have a one to one mapping, based on historical data associated with the extracted entity;
when the extracted entity and the field have the one to one mapping, select a corresponding value of the field as the value;
when the extracted entity and the field do not have the one to one mapping, obtain augmented extracted entity data;
process the augmented extracted entity data to determine one or more values of the field;
associate a probability score with each of the one or more values of the field of the data corresponding to the journal entry, the probability score being indicative of a likelihood of determination of the one or more values of the field of the data corresponding to the journal entry being correct;
compare the determined one or more values of the field of the data corresponding to the journal entry with an actual value of the field of the data present in the journal entry; and
based on the comparison, generate a notification indicative of the potential error and the anomaly in the data; and an anomaly detector coupled to the processor, the anomaly detector to,
process the data and the historical data associated with the data, based on at least one of predefined rules and a machine learning technique; and
detect the anomaly in the data, based on the processing, the anomaly being related to contextual information indicative of the deviation from behavioral aspects associated with the data.

2. The system as claimed in claim 1, wherein the system further comprises an augmentor coupled to the processor, the augmentor is to augment the extracted entity with augmentation data to determine features related to the extracted entity, the augmentation data including information pertaining to fields of the data from an external source.

3. The system of claim 2, wherein the classifier is to process the extracted data using augmented extracted data to determine the one or more values.

4. The system as claimed in claim 1, wherein the anomaly detector comprises:
a semantic matcher to determine whether a description of the journal entry is semantically similar to corresponding historical data to detect a semantic anomaly;
an outlier detector to determine whether the journal entry is in a standard statistical range to detect an outlier anomaly; and
a rule based anomaly detector to determine whether a journal entry property fits into a pre-defined acceptable range to detect a rule based anomaly.

5. The system of claim 1, wherein the system comprises a data generator coupled to the processor to generate the data to be validated, based on a supporting document.

6. The system as claimed in claim 1, wherein the system further includes a notification analyzer to,
receive the notification indicating that the data includes one of the potential error and the anomaly;
generate a hypothesis providing an explanation for the potential error and the anomaly; and
provide a remedial action for correcting the potential error and the anomaly.

7. A method comprising:
extracting data to be validated and associated supporting documents, the data including a journal entry in a ledger stored in a database, wherein validation of the data includes reconciliation of the journal entry in the ledger to identify a potential error and an anomaly indicative of a deviation from a predefined behavior in the journal entry and wherein the reconciliation is performed continuously in near-real time, in response to detection of a new journal entry in the database; and
extracting an entity associated with the data stored in the database using a natural language processing technique, the entity being indicative of a feature of the data associated with the journal entry in the ledger;
determining a value for a field of the data corresponding to the journal entry, based the extracted entity, the field of the data including information to be validated;
ascertaining whether the extracted entity and the field have a one to one mapping, based on historical data associated with the extracted entity;
when the extracted entity and the field have the one to one mapping, selecting a corresponding value of the field as the value;
when the extracted entity and the field do not have the one to one mapping, obtaining augmented extracted entity data;

processing the augmented extracted entity data to determine one or more values of the field;

associating a probability score with each of the one or more values of the field of the data corresponding to the journal entry, the probability score being indicative of a likelihood of determination of the one or more values of the field of the data corresponding to the journal entry being correct;

comparing the determined one or more values of the field of the data corresponding to the journal entry with an actual value of the field of the data present in the journal entry;

based on the comparison, generating a notification indicative of the potential error and the anomaly in the data;

processing the data and the historical data associated with the data, based on at least one of predefined rules and a machine learning technique; and detecting the anomaly in the data, based on the processing, the anomaly being related to contextual information indicative of the deviation from behavioral aspects associated with the data.

8. The method as claimed in claim 7, wherein the method further comprises augmenting the extracted entity with augmentation data to determine features related to the extracted entity, the augmentation data including information pertaining to fields of the data from an external source.

9. The method as claimed in claim 8, wherein the one or more values for the field is determined based on the augmented extracted data.

10. The method as claimed in claim 7, wherein processing the data and the historical data for detecting the anomaly comprises:

determining whether a description of the journal entry is semantically similar to corresponding historical data to detect a semantic anomaly;

determining whether the journal entry is in a standard statistical range to detect an outlier anomaly; and determining whether a journal entry property fits into a pre-defined acceptable range to detect a rule based anomaly.

11. The method as claimed in claim 7, wherein the method further comprises generating the data to be validated, based on a supporting document.

12. The method as claimed in claim 7, wherein the method further comprises:

receiving the notification indicating that the data includes one of the potential error and the anomaly;

generating a hypothesis providing an explanation for the potential error and the anomaly; and providing a remedial action for correcting the potential error and the anomaly.

13. A non-transitory computer readable medium including machine readable instructions that are executable by a processor to:

extract data to be validated and associated supporting documents, the data including a journal entry in a ledger stored in a database, wherein validation of the data includes reconciliation of the journal entry in the ledger to identify a potential error and an anomaly indicative of a deviation from a predefined behavior in the journal entry and wherein the reconciliation is performed continuously in near-real time, in response to, detection of a new journal entry in the database; and extract an entity associated with the data stored in the database using a natural language processing technique, the entity being indicative of a feature of the data associated with the journal entry in the ledger;

determine a value for a field of the data corresponding to the journal entry, based the extracted entity, the field of the data including information to be validated;

ascertain whether the extracted entity and the field have a one to one mapping, based on historical data associated with the extracted entity;

when the extracted entity and the field have the one to one mapping, select a corresponding value of the field as the value;

when the extracted entity and the field do not have the one to one mapping, obtain augmented extracted entity data;

process the augmented extracted entity data to determine one or more values of the field;

associate a probability score with each of the one or more values of the field of the data corresponding to the journal entry, the probability score being indicative of a likelihood of determination of the one or more values being correct;

compare the determined one or more values of the field of the data corresponding to the journal entry with an actual value of the field of the data present in the journal entry;

based on the comparison, generate a notification indicative of the potential error and the anomaly in the data;

process the data and the historical data associated with the data, based on at least one of predefined rules and a machine learning technique; and detect the anomaly in the data, based on the processing, the anomaly being related to contextual information indicative of deviation from behavioral aspects associated with the data.

14. The non-transitory computer readable medium as claimed in claim 13, wherein the one or more values for the field is determined based on the augmented extracted data.

15. The non-transitory computer readable medium as claimed in claim 14, wherein the processor is to:

receive the notification indicating that the data includes one of the potential error and the anomaly;

generate a hypothesis providing an explanation for the potential error and the anomaly; and provide a remedial action for correcting the potential error and the anomaly.

16. The non-transitory computer readable medium as claimed in claim 13, wherein the processor is to augment the extracted entity with augmentation data to determine features related to the extracted entity, the augmentation data including information pertaining to fields of the data from an external source.

17. The non-transitory computer readable medium as claimed in claim 13, wherein the processor is to determine whether a description of the journal entry is semantically similar to corresponding historical data to detect a semantic anomaly;

determine whether the journal entry is in a standard statistical range to detect an outlier anomaly; and determine whether a journal entry property fits into a pre-defined acceptable range to detect a rule based anomaly.

* * * * *